March 9, 1954 — W. SCHOENE ET AL — 2,671,225
ARTIFICIAL LIMB STUMP SOCKET
Filed Nov. 5, 1951

Inventors:
Waldemar Schoene
Donald G. Monroe
By Gary, Desmond & Parker
Attys.

Patented Mar. 9, 1954

2,671,225

UNITED STATES PATENT OFFICE 2,671,225

ARTIFICIAL LIMB STUMP SOCKET

Waldemar Schoene and Donald G. Monroe, Chicago, Ill., assignors to Bardach-Schoene Company, Inc., Chicago, Ill., a corporation of Illinois Application November 5, 1951, Serial No. 254,842

4 Claims. (Cl. 3—19)

This invention relates to improvements in artificial limbs, and more particularly to the provision of improved liners for artificial limb stump sockets.

It is a particular object of the present invention to provide a liner of the class described in the form of a soft but tough, flexible cushion of elastomeric nature, which does not warp, shrink, or tend to distort, and whose strength is not affected by aging, and which has unusual resistance to moisture, grease, acids or alkalis.

Due to problems encountered in fitting artificial limbs to sensitive stumps, and problems encountered by the amputees in wearing artificial limbs, many efforts have been made to provide a soft, flexible material as a liner at the point or area where the stump engages or bears on the stump socket. To this end it has been proposed, among many other things, to employ rubber in various forms and combinations. For example, it has been proposed to employ linings of sponge rubber faced with soft horsehide. Although immediate results were good inasmuch as this achieved a desirable cushioning effect, after a short time the sponge rubber packed and distorted, the cushioning effect was lost, and the socket presented no more than an actual filling. The same results were found when attempts were made to employ foam rubber. Attempts to employ sheet rubber with leather coverings to protect the skin of the stump from the rubber was also found to be unsuitable, since although the sheet rubber retained its shape, it had little cushioning effect and perspiration entered the leather, making cleaning impossible. Vulcanizable rubber latex compositions molded to desired form have also been found unsatisfactory due to the fact that on curing the rubber becomes hard and progressively so on installation and use, eliminating the desirable soft socket requirement. The use of fibrous materials, alone or in combination, such as for example felt, with binders or surface coatings, has also been found unsatisfactory, since if these are initially soft, they soon pack down and become hard or displaced. Facings of rubber alone or over a backing are also undesirable, since rubber in direct contact with skin is undesirable in that it becomes foul, hard, distorted from body acids, holds the moisture against the skin, and due to its nonskid properties causes abrasion of the skin.

We have, however, found, in accordance with the present invention, that we can overcome the foregoing defects, and accomplish the objects of our invention by employing as the essential component of a stump socket lining, plasticized polyvinyl chloride acetate. This thermoplastic synthetic resin is tough and flexible, and when plasticized becomes soft and elastomeric. It has a stable character in that it does not shrink, warp or tend to distort, its strength is not affected by aging, and it is highly resistant to tearing, abrasion and scuffing. It also has unusual resistance to moisture, greases, acids and alkalis. It does, however, have nonskid properties which provide undesirable frictional character if in direct contact with the skin in use, and we therefore provide the resin with a facing of an elastic fabric which will flex with the resin, and provides a relatively smooth friction-free surface.

The indicated resins are of high molecular weight and are copolymers of from about 85% and preferably from about 90% to about 95% of vinyl chloride, and the balance vinyl acetate. We plasticize these with preferably equal parts by weight of a compatible plasticizer, although for softer or harder compositions we may employ from about 60 to about 40 parts by weight of resin to from about 40 to about 60 parts by weight of plasticizer, the large proportion of plasticizer to resin giving softer compositions.

We have found that a particularly suitable plasticizer is butyl phthalyl butyl glycollate. Another example of a suitable plasticizer is one composed of approximately equal parts by weight of dioctyl phthalate, dibutyl phthalate and butyl phthalyl butyl glycollate.

The resin is normally supplied by the manufacturer in the form of white granular powders, and it is thereafter mixed with the indicated plasticizer together with heat stabilizer, and, if desired, coloring matter, to form a plastisol, and then fused and molded under heat and pressure to desired shape, such as a flat sheet.

Further objects and advantages of our invention, together with the details thereof and arrangement of parts, will be apparent from a consideration of the following specification and drawings, wherein.

Figure 1:
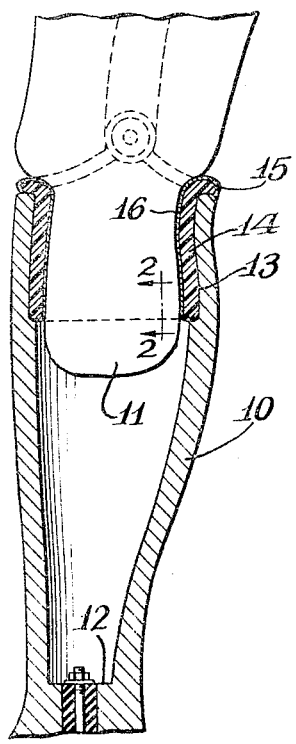
Fig. 1 is a vertical section of an artificial limb stump socket member, lined in accordance with the present invention, showing a limb stump in place therein.

Referring to the drawings, the reference numeral 10 indicates an artificial limb stump socket member wherein a limb stump 11 is received in spaced relation to the bottom 12 of the socket.

The member 10 is composed of wood or any other material conventional to the art, and is formed to a size and shape which will fit as accurately and comfortably as possible; that is, the socket or inner wall at the upper end of the member 10 is first contoured so as to form a substantially embracing engagement with the periphery of the stump 11. After this fitting, the socket is recessed as at 13, following the contours of the socket, and a sheet 14 of plasticized, soft, flexible, elastomeric polyvinyl chloride-acetate, of suitable size and thickness, and in the shape of a conventional liner, is fitted into the recessed portion 13, allowing enough material at the top for the overlap 15. The liner is bonded to the recessed inner wall 13 of the socket by means of a suitable glue and preferably set by heat, the heat also serving to soften the thermoplastic resin liner so that it can be firmly molded against, and conform to the contour of, the recessed wall and the rim of the socket. The liner 14, as applied, carries a bonded facing of a relatively friction-free or slick, flexible fabric 16 bonded thereto, its prime function being to compensate for the character of the resin lining layer 14. That is to say, the resin, even though molded as smooth as possible, is of a tractive nature and may cause undesirable rubbing of the skin of the received limb stump in the process of pumping or relative movement of the stump and socket in use and walking. We therefore surface the resin layer 14 with a fabric which will be non-tractive and substantially eliminate such undesirable friction or rubbing. We have found that a woven fabric, such as Nylon tricot, is highly suitable. As non-fully equivalent alternatives, other woven fabrics may be employed, such as cotton, wool, or cloth of other natural fibers, or other woven fabrics of synthetic fibers. These are preferably of an open or "sleazy" weave, and further preferably cut on the bias to permit adequate flexing jointly with the soft, flexible plastic resin layer 14.

The resin layer 14 and the fabric layer 16 are preferably pre-bonded into a composite under heat and pressure. Thus, for example, in forming the composite, a doughy-like mixture or plastisol of plasticized resin is placed in a mold between sheets of cellophane and heated for about seven to ten minutes at a temperature of about 212–220° F., and then pressure is applied for about three to four minutes to fuse the resin and to form a homogeneous sheet. The top layer of cellophane is then removed and a sheet of fabric, such as the indicated Nylon material, is placed on top of the plastic, and another sheet of cellophane is then placed over the Nylon. The mold is then placed in the press and pressure applied for about two minutes, whereupon the cloth becomes firmly laminated with and bonded to the plastic. Since the applied surface layer of woven fabric may be moisture absorbent, is is coated with a waterproofing material such as paraffin, Australian wax or the like, after the fabric-coated plastic layer has been installed in the socket.

The resulting socket is soft and cushions the stump while walking. It presents a soft, flexible surface to cushion the bony, sensitive surfaces of the amputated stump. The woven Nylon fabric lamination presents a jointly flexible, slick surface to permit smooth entrance and removal of the stump. The normal pumping action of the stump is permitted by the slick Nylon surface without irritation. The waterproofing prevents perspiration from entering the Nylon fabric and thereby promoting sanitation and cleanliness in the socket.

Unlike any of the present so-called "soft socket" limbs, wherein the cushioning member is composed principally of leather, felt, or sponge rubber, the entire surface of our stump socket is soft and flexible, and the body of the liner throughout its thickness maintains the even degree of softness without packing, shifting, or loss of elasticity. The material has no chemical component harmful to the human skin. It is waterproof and prevents penetration of perspiration or moisture into the wooden walls of the shin.

Furthermore, this soft socket can be installed in any thickness desired to increase or decrease the flexibility and size of the socket. Should stump atrophy occur, the socket can be removed and another of suitable thickness installed, thus prolonging the life of the artificial limb.

Figure 3:
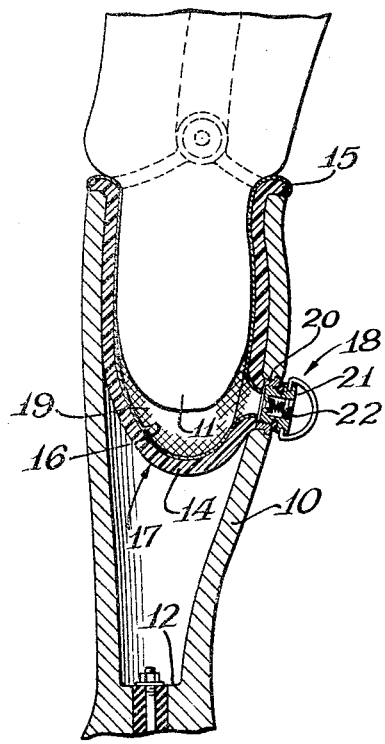
Fig. 3 is a view similar to that of Fig. 1, illustrating a modified form of our invention.
Figure 2:
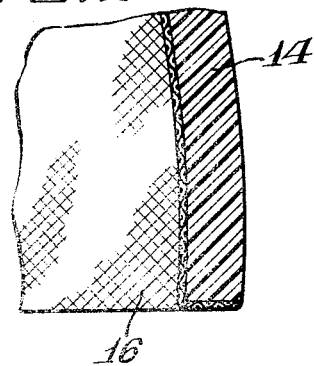
Fig. 2 is an enlarged sectional detail taken on the line 2—2 of Fig. 1.

Fig. 3 illustrates a modified form of liner generally indicated at 17. This liner is in the form of a sac, but is otherwise composed of the same fabric-coated plastic as previously described, the sac being adapted to enclose the limb stump 11 but extends in spaced relation to the bottom of the stump and is also spaced from the bottom 12 of member 10. This sac 17 may be fabricated by molding a sheet of the previously described plastic over a built-up plaster cast of the amputated stump by heat-softening the thermoplastic material and welding it at the seams. It is thereafter inserted and adhesively united to the wooden shin 10 in a manner similar to that previously described, and provides a yieldable pressure chamber beneath the stump.

This form is further thereby well adapted for use in artificial limbs of the suction socket type, and to this end there is employed air relief valve means generally indicated as 18 and such as is illustrated in U. S. Patent No. 2,533,404, for regulating the air pressure in chamber 19 when the stump is urged into the socket and to create a partial vacuum therein when the stump is urged outwardly. To this end the shin member 10 is formed with a lateral opening, seating the threaded annular bushing 20, and the soft cushioning lining is likewise formed with an opening which merges with and is sealed to the bushing. A threaded valve cap 21 is provided for bushing 20, and removal thereof provides ready exhaustion of air for ease in inserting the limb stump, and likewise ready ingress of air for ease in complete withdrawal of the stump. In use the cap 21 is retained in position, and intermittent relief of alternate pressure and vacuum resulting from pumping action during walking is provided by the adjustable relief valve means 22 extending axially of the cap 21. This controls communication between the chamber 19 and the outside atmosphere and is effective to maintain a predetermined air pressure in the chamber, which, aided by the elastic, spaced free bottom of the liner sac 17, cushionably supports the stump 11, in addition to the soft cushioning action of the liner as a whole.

We claim as our invention:

1. The combination with an artificial limb stump socket member formed with a side wall adapted to embrace and follow the contour of the periphery of a limb stump, of a soft, flexible cushion liner adhered to said side wall and conforming to the contour thereof composed of a layer of plasticized polyvinyl chloride-acetate and a woven flexible fabric facing bonded thereto and carrying a moisture-resistant coating for said fabric.

2. The combination with an artificial limb stump socket member formed with a side wall adapted to embrace and follow the contour of the periphery of a limb stump, of a soft, flexible cushion liner adhered to said side wall and conforming to the contour thereof composed of a layer of plasticized polyvinyl chloride-acetate and a woven Nylon fabric facing bonded thereto and carrying a moisture-resistant coating for said fabric.

3. The combination with an artificial limb stump socket member formed with a side wall adapted to embrace and follow the contour of the periphery of a limb stump and a bottom portion adapted to be spaced therefrom, of a soft, flexible elastomeric cushion liner composed of plasticized polyvinyl chloride-acetate and a relatively slick woven flexible facing fabric bonded thereto and carrying a moisture-resistant coating for said fabric, said liner being in the form of a sac having an open mouth and adhered thereat to said side wall and conforming to the contour thereof, the opposed closed end of said sac extending in spaced relation to said socket member bottom portion and adapted to be spaced from the limb stump bottom to define a chamber beneath the stump.

4. The combination with an artificial limb stump socket member formed with a side wall adapted to embrace and follow the contour of the periphery of a limb stump and a bottom portion adapted to be spaced therefrom, of a soft, flexible elastomeric cushion liner composed of plasticized polyvinyl chloride-acetate and a relatively slick woven flexible facing fabric bonded thereto and carrying a moisture-resistant coating for said fabric, said liner being in the form of a sac having an open mouth and adhered thereat to said side wall and conforming to the contour thereof, the opposed closed end of said sac extending in spaced relation to said socket member bottom portion and adapted to be spaced from the limb stump bottom to define a chamber beneath the stump, and air relief valve means carried by said socket member disposed to control communication between said chamber and the outside atmosphere.

WALDEMAR SCHOENE.
DONALD G. MONROE.

References Cited in the file of this patent

UNITED STATES PATENTS

| Number | Name | Date |
|---|---|---|
| 980,457 | Toles | Jan. 3, 1911 |
| 1,861,311 | Logan | May 31, 1932 |
| 2,310,889 | Becker | Feb. 9, 1943 |
| 2,533,404 | Sharp et al. | Dec. 12, 1950 |
| 2,578,019 | Ryan | Dec. 11, 1951 |

OTHER REFERENCES

Report of Annual Spring Conference of Advisory Committee on Artificial Limbs, National Research Council, Washington, D. C., May 7–10, 1951, page 40, lines 31–33. (A copy is in Div. 55 of the U. S. Patent Office. Class 3 Literature on Desk #3.)